United States Patent Office 3,355,429
Patented Nov. 28, 1967

3,355,429
COPOLYMERS OF ALIPHATIC ALDEHYDES
AND PROCESS FOR MAKING THEM
Klaus Weissermel, Kelkheim, Taunus, and Karl Rehn, Hofheim, Taunus, Germany, assignors to Farbwerke Hoechst Aktiengesellschaft vormals Meister Lucius & Brüning, Frankfurt am Main, Germany, a corporation of Germany
No Drawing. Filed July 6, 1966, Ser. No. 563,091
Claims priority, application Germany, Apr. 16, 1960, F 31,022
6 Claims. (Cl. 260—67)

ABSTRACT OF THE DISCLOSURE

High molecular weight copolymers of acetaldehyde with higher saturated aldehydes of from 3 to 9 carbon atoms and copolymerization of said monomers in monomer ratios of about 1:4 to 20:1 at −30 to −120° C. in presence of organometallic catalyst.

---

This application is a continuation-in-part of our earlier application, Ser. No. 103,218 filed Apr. 17, 1961, now abandoned.

It is known that acetaldehyde, propionaldehyde and higher saturated, aliphatic aldehydes can be homopolymerized in the presence of organo-alkaline compounds into products of high molecular weight. It is also known that these aldehydes can be homopolymerized in the presence of metal compounds such, for example, as $Al(C_2H_5)_3$ or $Zn(C_2H_5)_2$.

The present invention provides novel copolymers of saturated aliphatic aldehydes which have interesting properties and are insoluble in the customary organic solvents, for example, in aliphatic, alicyclic, aromatic hydrocarbons, aliphatic alcohols, ketones and esters. More especially, the invention provides copolymers of acetaldehyde with higher saturated aliphatic aldehydes containing 3 to 9 carbon atoms.

The invention also provides a process for making the above copolymers, wherein saturated, aliphatic aldehydes which preferably contain from 3 to 9 carbon atoms are copolymerized with acetaldehyde in the presence of anionically active metal compounds, such as metal alkyl compounds whose alkyl groups may be replaced wholly or partially by hydrogen atoms and/or alkoxy groups, or more advantageously in the presence of organic compounds of a metal belonging to groups 2 and 3 of the Mendeleeff Periodic Table, the copolymerization being carried out by the mass or suspension process at low temperatures, preferably at −50° to −90° C.

These results are unexpected and surprising since our earlier attempts to effect ionic copolymerization were limited to a few cases and often involved poor yields. Thus, for example, we found it difficult to copolymerize acetaldehyde with propionaldehyde or higher saturated aldehydes in the presence of cationically active compounds, for example in the presence of $BF_3$, and obtained only poor yields. In contradistinction thereto, the copolymerization according to this invention of acetaldehyde with higher saturated aliphatic aldehydes in the presence of anionically active compounds, for example, in the presence of organo-metal compounds, proceeds rapidly and leads to high yields.

The copolymerization can be carried out, for example, in the presence of organic metal compounds corresponding to the general formula:

$$Me(R)_n$$

wherein Me advantageously represents a metal of groups 2 and 3 of the Mendeleeff Periodic Table, $(R)_n$ stands for $n$ substituents comprising a hydrogen and/or monovalent aliphatic hydrocarbon radicals which preferably contain 1 to 10 carbon atoms and/or monovalent alkoxy radicals which preferably contain 1 to 10 carbon atoms, and $n$ corresponds to the valency of the metal.

The following organic metal compounds are mentioned by way of example: triethyl-aluminum, triisobutyl-aluminum, trioctylaluminum, diethyl-aluminum hydride, diisobutyl-aluminum hydride, ethoxy-diethyl-aluminum, di-n-butoxyethyl - aluminum, tri-isopropoxy - aluminum, tributyl-borone, diethyl-zinc, butoxyethyl-zinc, diethyl-cadmium.

The above anionically active compounds may be used alone or in admixture with one another or, if desired, in the form of their known complex compounds, for example, as stable etherates. The copolymerization of the aldehydes is already initiated by traces of the above metal compounds. The copolymerization proceeds at industrially useful rates by using the catalysts in a proportion of 0.0005 to 1% by weight, preferably 0.005 to 0.5% by weight, calculated on the weight of the mixture of comonomers. Catalyst concentrations greater than indicated above may be used, but they generally reduce the yield.

The catalyst or catalyst mixture may be introduced into the polymerization vessel before or during the copolymerization or may be added in dilute form, for example, in the form of a solution in an inert organic solvent which is advantageously the same solvent in which the polymerization is carried out.

When the aldehydes are mass-polymerized, it is advantageous to dilute the catalyst or catalyst mixture with an inert organic solvent whereby the addition of very small quantities of catalyst is facilitated.

When the polymerization is conducted in the presence of an organic solvent, the following compounds may be used for example: aliphatic, cycloaliphatic, araliphatic and unsaturated hydrocarbons or mixtures of hydrocarbons provided that these compounds are not changed by the catalyst system. These hydrocarbons should have a freezing point which is below that temperature which is used for polymerization or more especially, they should have a freezing point of less than −30° C. There may be mentioned, for example: propene, propane, butane, pentane, hexane, heptane, cyclobutane, cyclopentane, cyclohexene, toluene, ethylbenzene, propylbenzene.

The proportion of inert, organic solvent used depends on the polymerization conditions selected and generally varies between 1 and 10 parts by wight, per part by weight of monomer.

The copolymerization is generally carried out with acetaldehyde and higher aldehyde comonomers present in proportions by weight ranging from about 1:4 to 20:1, preferably from about 1:2 to about 10:1, and at temperatures between −30° C. and −120° C., advantageously between −50° and −90° C. Superatmospheric pressure is not required. Since, in most cases, the polymerization takes a very rapid course, care should be taken that the polymerization heat can be readily dissipated. The resulting polymer precipitates during the polymerization. The copolymers obtained by the process of this invention have molecular weights of 10,000–500,000, preferably 20,000–166,000, and are insoluble in the customary organic solvents, for example in aliphatic, alicyclic or aromatic hydrocarbons, aliphatic alcohols, ketones and esters. In some solvents, predominantly in halogenated hydrocarbons, for example, methylene chloride and chloroform, the polymers undergo swelling. The X-ray scattering diagrams of the copolymers are characterized by intense sharp or somewhat broader reflexes which would appear to indicate a state of higher orientation.

The X-ray scattering diagram of a polymer mixture is different from that of a copolymer.

The infrared spectra of the copolymers exhibit the bands which are characteristic of the recurring acetal groupings:

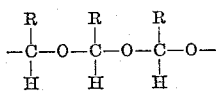

Moreover, the carbonyl band which is characteristic of aldehydes cannot be detected. The infrared spectrum of a polymer mixture also shows distinct differences as compared with the infrared spectrum of a copolymer.

The copolymers are very tough and partially slightly elastic. They have a good stability to solvents and after appropriate stabilization they can be made into shaped articles having interesting properties. The X-ray scattering diagram shows that the products are substantially crystalline with a crystalline portion of more than 50%.

All the polymerization reactions described in the following examples were carried out with the substantial exclusion of moisture and air. The infrared spectra were taken on powdered polymers by means of the known KBr-technique in a Perkin Elmer infrared spectroscope, Model 21. The X-ray scattering diagrams of the powdered polymers were taken by means of a tube counter difractometer according to Prof. Berthold.

The following examples serve to illustrate the invention, but they are not intended to limit it thereto, the parts being by weight unless otherwise stated.

*Example 1*

26 parts acetaldehyde and 25 parts propionaldehyde were dissolved in 60 parts pentane and combined at −78° C. with 0.08 part triethyl-aluminum. After 30 minutes, the polymerization batch had solidified to a tough block. The block so obtained was ground, washed with methanol and dried in vacuo at 30° C. 48 parts of a white, slightly elastic and tough copolymer were obtained. The determination of the terminal groups by spectroscopic analysis indicated a molecular weight of 60,000. The copolymer obtained differed from a mixture of the two homopolymers by bands in the UR spectrum at 6.8 and 11.9μ.

*Example 2*

15 parts acetaldehyde and 15 parts propionaldehyde were dissolved in 40 parts pentane and combined at −70° C. with 0.07 part diethyl-aluminum hydride. Polymerization set in rapidly. The batch was worked up after 8 hours. The copolymer was obtained in a yield of 24 parts.

*Example 3*

10 parts acetaldehyde and 15 parts propionaldehyde were dissolved in 30 parts cyclohexene and combined at −68° C. with 0.06 part diethyl-zinc. In the course of the polymerization, the copolymer was obtained in the form of a solid, tough block. The yield amounted to 19 parts.

*Example 4*

15 parts isobutyraldehyde and 16 parts acetaldehyde were dissolved in 50 parts pentane and combined dropwise at −68° C. with a solution of 0.105 part triethyl-aluminum in 5 parts pentane. The copolymer precipitated during the polymerization. After 30 hours, the copolymer was taken up in methanol, washed and dried. The yield amounted to 30 parts. The copolymer obtained differed from a mixture of the two homopolymers by bands in the UR spectrum at 6.9 and 11.1μ.

*Example 5*

10 parts 3,3,5-trimethyl-hexanal and 20 parts propionaldehyde were combined at −75° C. with 60 parts propene and 0.08 part triethyl-aluminum, and the whole was maintained at that temperature for 40 hours. The yield amounted to 14 parts.

*Example 6*

10 parts acetaldehyde and 1 part propionaldehyde were combined at −72° C. with 20 parts pentane, 0.05 part aluminum isopropylate and 0.05 part triethyl-aluminum. The copolymer precipitated during the polymerization which set in rapidly. The whole was worked up and dried as usual. 7 parts of a tough copolymer were obtained.

*Example 7*

10 parts acetaldehyde and 20 parts propionaldehyde were combined dropwise at −90° C. with a solution of 0.08 part diethyl-zinc in 0.5 part absolute pentane. Polymerization set in after a short time. In the course of the polymerization, a tough block of polymer was obtained. The yield amounted to 24 parts. The determination of the terminal groups by spectroscopic analysis indicated a molecular weight of 45,000.

We claim:
1. A process for the production of copolymers which comprises the step of copolymerizing acetaldehyde with a higher aliphatic saturated aldehyde having from 3 to 9 carbon atoms at a temperature within the range of −30 to −120° C. while in the presence of 0.0005 to 1%, calculated on the total weight of the monomers, of at least one organic metal compound of the formula

$$Me(R)_n$$

wherein Me represents a metal of groups 2 and 3 of the Periodic Table of Mendeleeff, R represents a member selected from the group consisting of a hydrogen radical, a monovalent radical of an aliphatic hydrocarbon containing 1–10 carbon atoms and a monovalent alkoxy radical containing 1–10 carbon atoms and $n$ corresponds to the valency of said metal, the proportion by weight of acetaldehyde and higher aldehyde comonomers being from about 1:4 to about 20:1.

2. A process for the production of copolymers which comprises the step of copolymerizing acetaldehyde with a higher aliphatic saturated aldehyde containing from 3 to 9 carbon atoms at a temperature within the range of −50 to −90° C. while in the presence of 0.005 to 0.05%, calculated on the total weight of the monomers, of at least one member selected from the group consisting of triethyl-aluminum, triisobutyl-aluminum, trioctyl-aluminum, diethyl-aluminum hydride, diisobutyl-aluminum hydride, ethoxy-diethyl-aluminum, di-n-butoxyethyl-aluminum, triisopropoxy-aluminum, tributylboron, diethyl zinc, butoxyethyl-zinc and diethyl cadmium, the proportion by weight of acetaldehyde and higher aldehyde comonomers being from about 1:2 to about 10:1.

3. Copolymer formed of acetaldehyde and a higher, saturated, aliphatic aldehyde containing from 3 to 9 carbon atoms, the proportion by weight of acetaldehyde and higher aldehyde comonomers being from about 1:4 to about 20:1 and said copolymer having a molecular weight of 10,000 to 500,000, being insoluble in aliphatic, alicyclic, aromatic hydrocarbons, aliphatic alcohols, ketones and esters and having an infrared spectrum characteristic of recurring acetyl groups.

4. Copolymer formed of acetaldehyde and a higher, saturated aliphatic aldehyde containing from 3 to 9 carbon atoms, the proportion by weight of acetaldehyde and higher aldehyde comonomers being from about 1:2 to about 10:1 and said copolymer having a molecular weight of 10,000 to 500,000, being insoluble in aliphatic, alicyclic, aromatic hydrocarbons, aliphatic alcohols, ketones and esters and having an infrared spectrum characteristic of recurring acetyl groups.

5. Copolymer as defined in claim 3 wherein the higher aldehyde comonomer is propionaldehyde.

6. Copolymer as defined in claim 3 wherein the higher aldehyde comonomer is isobutylaldehyde.

(References on following page)

References Cited

UNITED STATES PATENTS 3,183,210  5/1965  Furukowa et al. _____ 260—67

OTHER REFERENCES

Conant et al.: Journal of American Chemical Society, vol. 54 (February 1932), pp. 628–635.

Bevington: Quarterly Reviews (London), vol. 6, No. 2 (1952), pp. 141–156.

Natta et al.: Die Makromolekulare Chemie, vol. 37 (April 1960), pp. 156–159.

WILLIAM H. SHORT, *Primary Examiner.*

L. M. PHYNES, *Assistant Examiner.*